Figure 1:
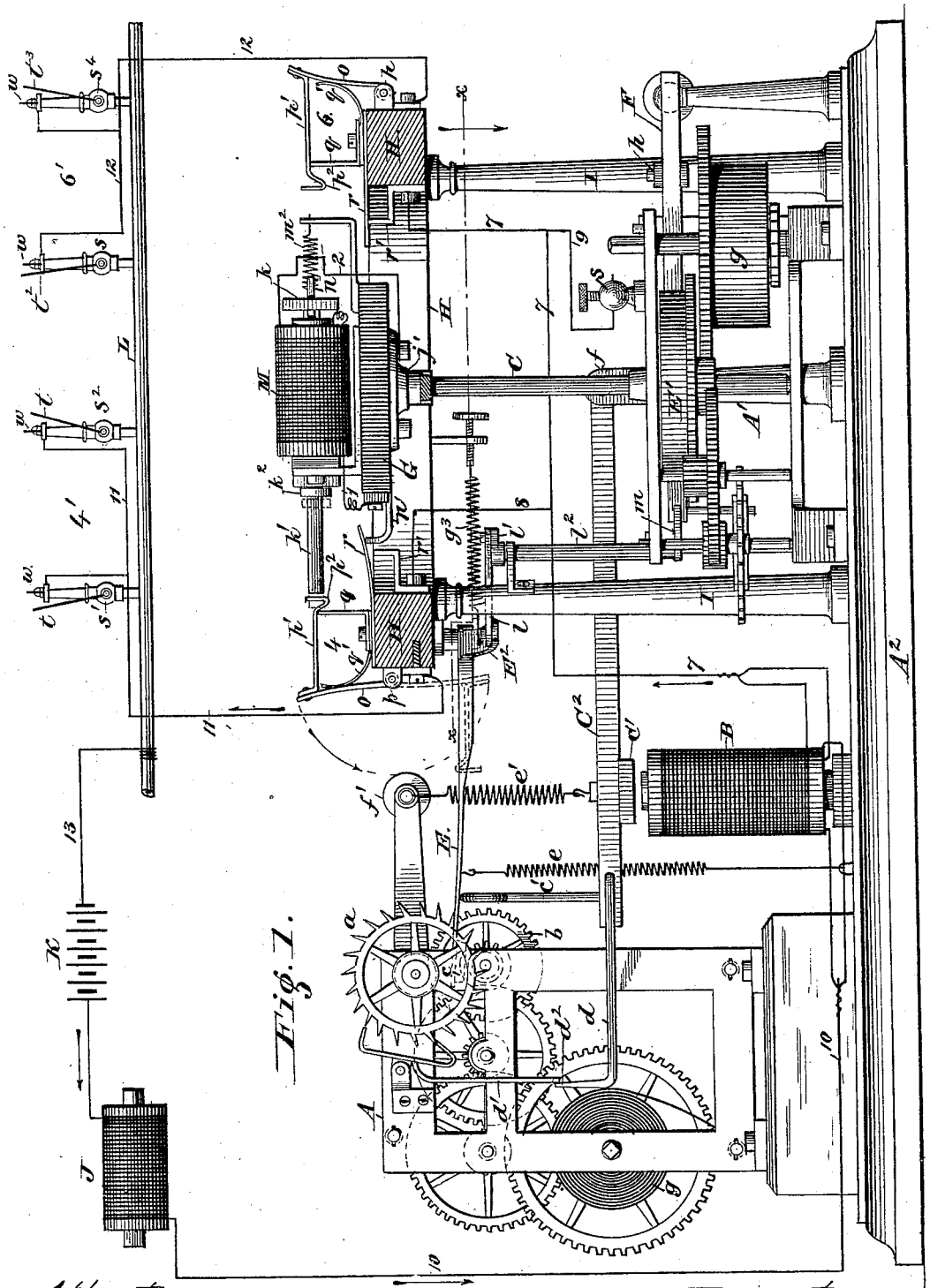

(No Model.)  4 Sheets—Sheet 1.

W. H. SAWYER.
AUTOMATIC ELECTRIC CIRCUIT OPENER.

No. 279,023. Patented June 5, 1883.

Attest
H. D. Pennie
H. S. Abbot

Inventor
William H. Sawyer
By Fred W. Royce Atty (No Model.) 4 Sheets—Sheet 3.
W. H. SAWYER.
AUTOMATIC ELECTRIC CIRCUIT OPENER.

No. 279,023. Patented June 5, 1883.

Attest:
H. L. Bennie
H. J. Abbot.

Inventor.
Wm H. Sawyer.
By Fred W. Royce
Atty.

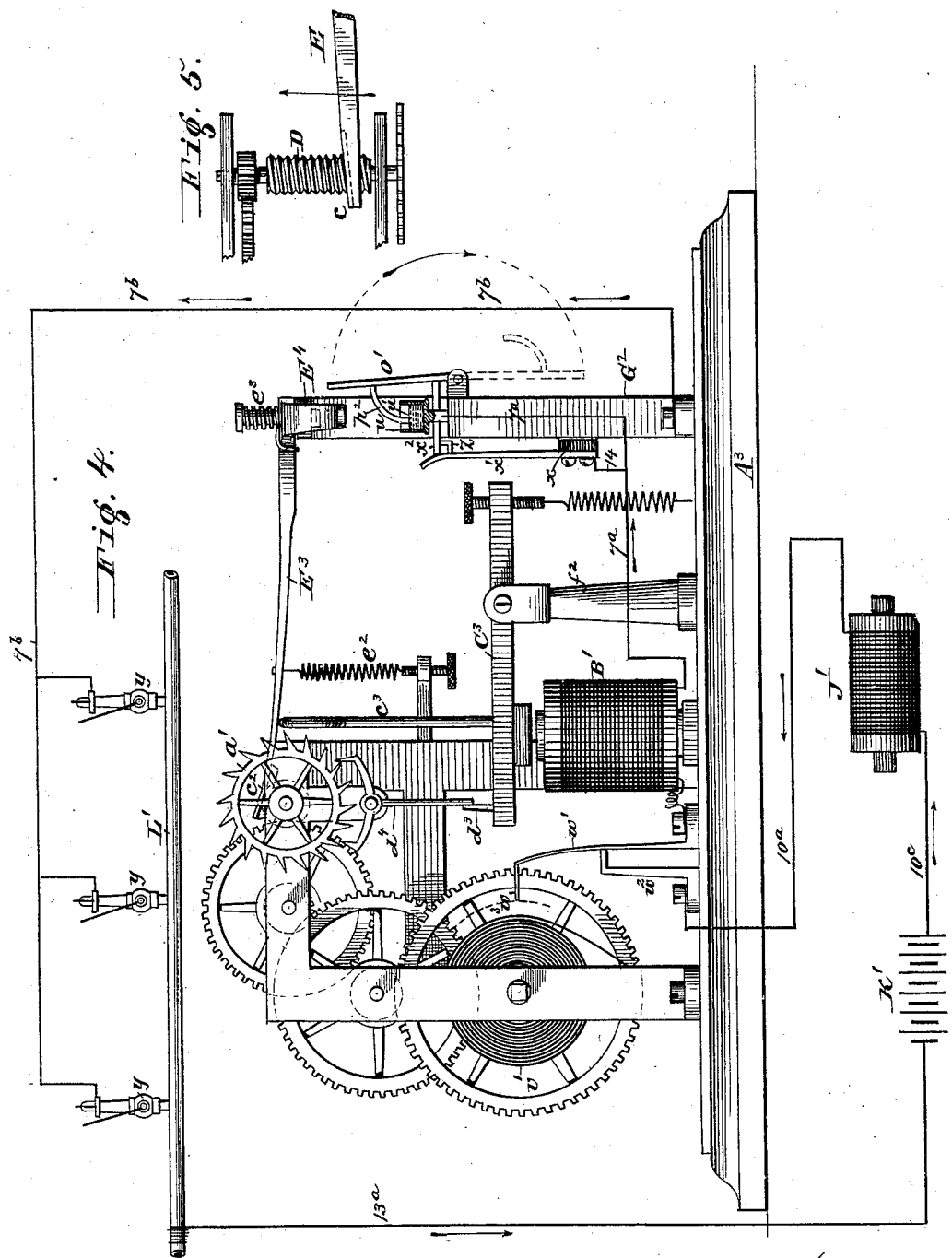

UNITED STATES PATENT OFFICE.

WILLIAM H. SAWYER, OF PROVIDENCE, RHODE ISLAND, ASSIGNOR OF ONE-HALF TO EUGENE F. PHILLIPS, OF SAME PLACE.

AUTOMATIC ELECTRIC-CIRCUIT OPENER.

SPECIFICATION forming part of Letters Patent No. 279,023, dated June 5, 1883.

Application filed September 28, 1880. (No model.)

*To all whom it may concern:*

Be it known that I, WILLIAM H. SAWYER, a citizen of the United States, residing at Providence, in the county of Providence and State of Rhode Island, have invented certain new and useful Improvements in Automatic Electric-Circuit Openers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to automatic circuit-openers particularly adapted for use in connection with systems of gas-lighting by electricity, wherein the gas is lighted by a spark from a galvanic battery and a spark-coil. It is also applicable to other systems of electric circuits. Its object is to provide a means for automatically opening the circuit of a battery, or for disconnecting one or more circuits which are in connection with a battery, when from any cause such battery or circuits remain closed longer than it is necessary to light the gas. There are several systems of electric gas-lighting in which the operation of turning on the gas and the production of an electric spark are simultaneous. In one of these systems the gas-cock attached to the fixture is rotated by means of a ratchet and pawl operated by a lever to which is attached a short length of metal chain. The gas-cock also carries another lever which forms a movable electrode in connection with the source of electricity, a fixed electrode being fastened to the tip of the burner in such relation to the orifice that when the gas is turned on the movable electrode will approach, make momentary contact with the fixed electrode, and then pass beyond it. At this point the spark is produced and the gas is ignited. For the purpose of producing the spark the Leclanché or other "open" circuit-battery is generally used, which, though admirably adapted for the purpose, as long as the circuit or circuits are closed but momentarily, as when used to light the gas, yet when the circuit is closed for a long time quickly polarizes and is rendered unfit for further service. It frequently happens, through accident or design, that the metal chain which is used to operate the gas-cock mechanism is thrown over the burner, and a contact made between it and the fixed electrode, thus putting the battery on "short circuit," or through defective mechanical construction the movable electrode fails to return to its normal position after making contact with the fixed electrode and remaining in contact therewith, the battery-circuit is closed; or in the system of circuit-wires which are connected to the different burners connection is often made between one circuit and the return-wire of the system, (which is generally the system of gas or water pipes located in the building,) and in this way the battery may be short-circuited.

My invention consists of mechanism, hereinafter more particularly described, which is placed in the circuit, preferably near the battery, and which, whenever the circuit is closed in the operation of lighting the gas, is momentarily actuated; but the complete action of the apparatus is not attained until the circuit has been closed a definite length of time.

In practice the apparatus is adjusted to allow a margin of thirty or forty seconds of time for the closing of the circuit; but if it remains closed longer than this time the mechanism will continue in operation and cause the circuit to be opened, and it will remain open until the cause of the interruption has been removed, after which the apparatus can be restored to its normal condition in readiness for further similar duty.

In the practical operation of the various systems as many as fifty circuits, each one comprising a number of burners, are often established, these circuits drawing their electrical energy from the same source, and should any one of them short-circuit the battery the other circuits would be rendered inoperative. By my invention I am enabled to open and throw out of the system one or more circuits when they remain closed longer than a fixed time, thus permitting the remaining circuits to be operated without being affected by the defective ones.

Figure 2:
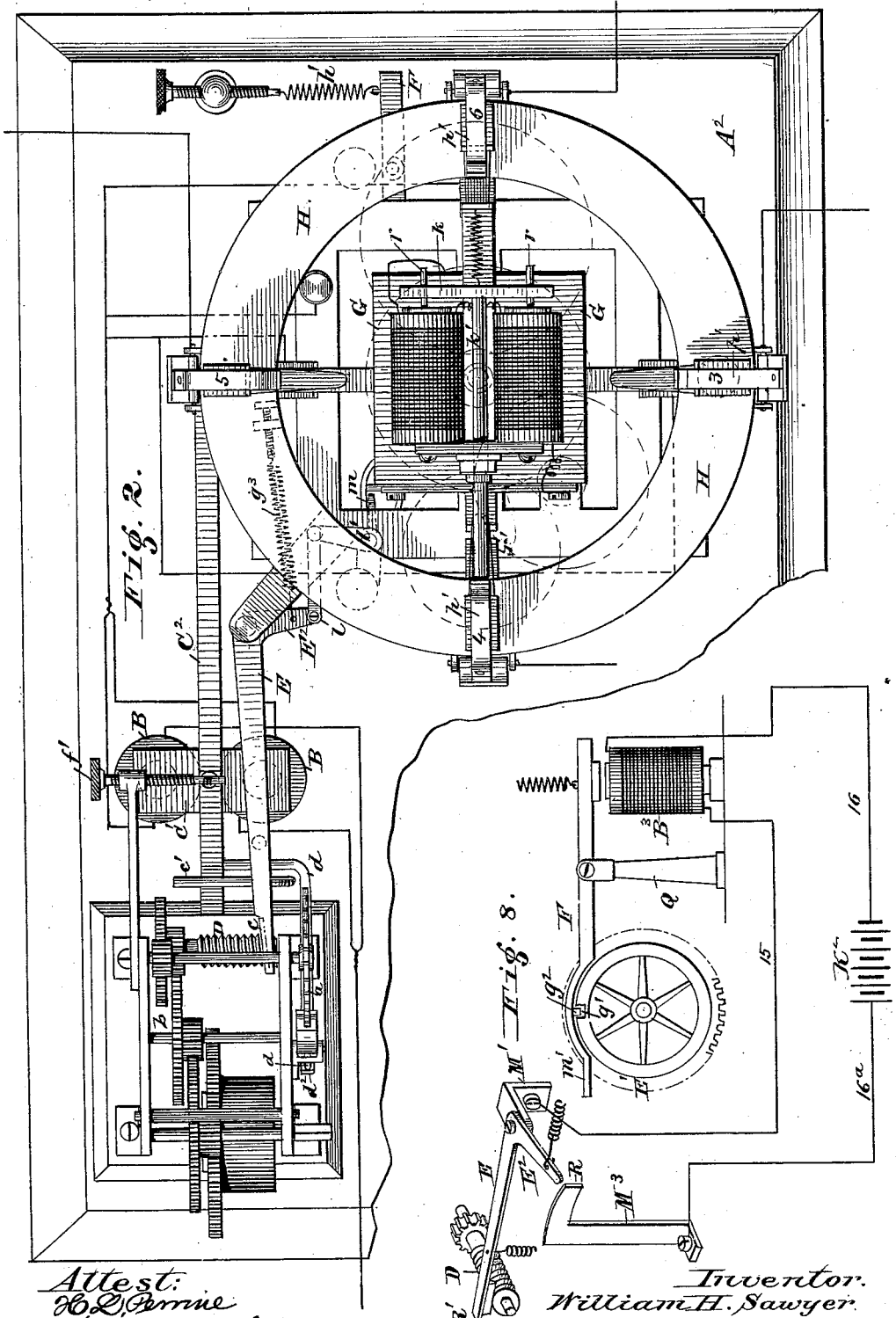
Figure 3:
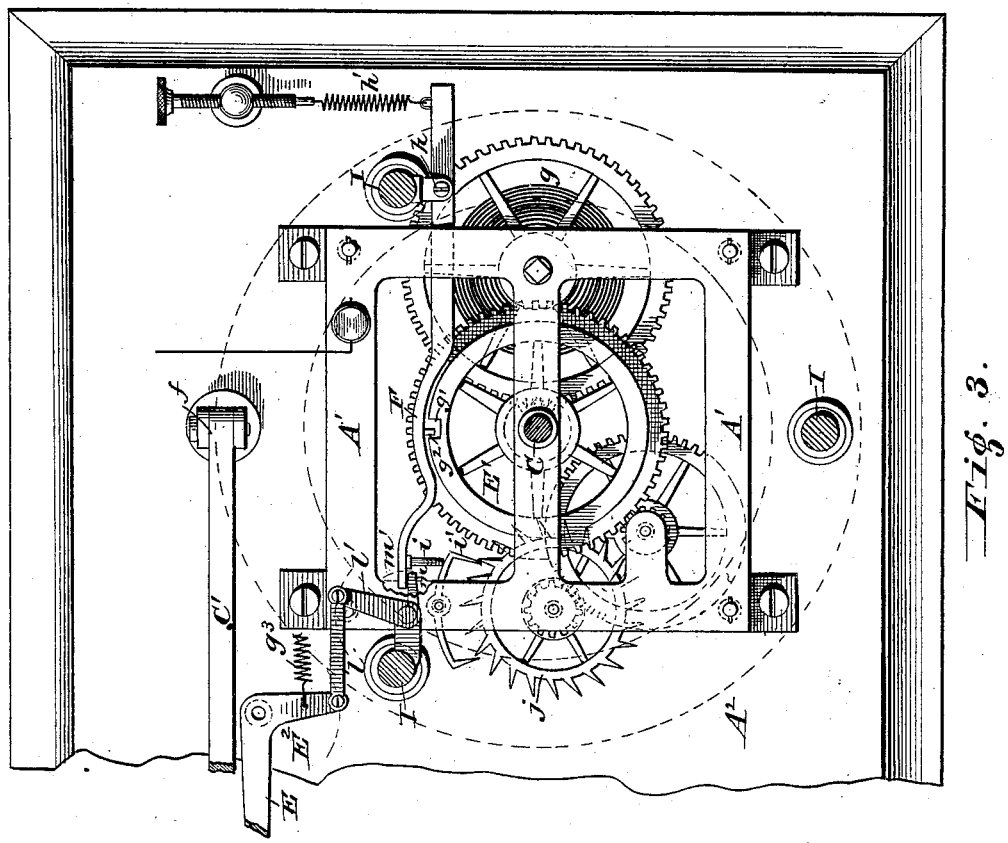

In the drawings accompanying this specification, Figure 1 is a front elevation of my invention, partly in section. Fig. 2 is a top view. Fig. 3 is a plan view below the dotted line $xx$, Fig. 1. Figs. 4, 6, 7, and 8 are views of modifications. Fig. 5 is a detail view.

The letter A indicates a time mechanism, and A′ a spring-motor, both of which are secured to a base, $A^2$, the motor being placed on its side, or with its wheels revolving in horizontal planes, in order that the central shaft, C, may occupy a vertical position.

Fixed upon the shaft of the wheel $b$, which drives the escapement-wheel $a$ of the time mechanism A, is a worm, D, the thread of which is arranged to receive the turned-down edge $c$ of one extremity of the bell-crank lever E, so that the movement of the said worm will cause the lever to move rearwardly, as shown in Fig. 5, against the stress of a spring, $g'$, which is attached to the prolongation $E^2$ of lever E.

The letter B indicates an electro-magnet, having its coils connected in multiple arc for the purpose of reducing the resistance thereof, said coils being provided with an armature, C′, which is attached to a lever, $C^2$, pivoted to a standard at $f$.

At the free extremity of the lever $C^2$ are fixed two rods, $c'$ and $d$, their free extremities being bent, as shown. The lever $C^2$ is also provided with a retractile spring, $e'$, which is operated by a finger-screw, $f'$, which is secured to a suitable standard. In its normal position of rest the rod $c'$ is against the under side of the bell-crank lever E, and serves to lift said lever clear of the worm D against the stress of the retractile spring $e$. The extremity $d^2$ of rod $d$ serves as a detent for the escapement-rod $d'$, and it can be readily perceived that when a current of electricity of suitable strength is passed through the magnet B the lever $C^2$ will be drawn toward the poles of said magnet, and that the detent $d^2$ will release the escapement and allow the clock-work to rotate, and at the same time the rod $c'$ will be drawn downward until the edge $c$ of lever E falls into the worm D, the movement of which will carry the said lever rearwardly, as indicated by the arrow, Fig. 5. The motor A′ has fixed to the central shaft, C, a wheel, E′, Fig. 3, which has a transverse slot, $g'$, in the periphery thereof, which is adapted to receive a pin, $g^2$, which is attached to a lever, F, the said lever being pivoted at $h$ and provided at one extremity with a retractile spring, $h'$. A short distance from the other extremity, $m'$, of said lever is fixed a pin, $i$, which serves as a stop to prevent the vibration of the escapement $i'$ and the consequent movement of the escapement-wheel $j$ and the connected gearing.

Pivoted to the prolongation $E^2$ of lever E is a series of levers, $l\,l'$, the latter being pivoted to an extension of a vertical shaft, $l^2$.

Fastened to the lower end of shaft $l^2$ is an arm, $m$, which engages with the extremity $m'$ of lever F, Fig. 3. When the lever E is carried by the worm D to its full length, the levers $l\,l'$ operate to rotate the shaft $l^2$, and the arm $m$, attached thereto, is pressed against the extremity $m'$ of lever F. The latter is moved against the stress of the retractile spring $h'$, and with it the pins $i$ and $g^2$, the former being released from contact with the escapement $i'$ and the latter being removed from the slot $g'$ of wheel E′, whereupon the clock-work or time mechanism A will rotate until the lever E returns to its normal position and the pin $g^2$ enters the slot $g'$, which will stop further movement.

To the upper extremity of the central shaft, C, is fixed a metal head, $j'$, to which is fastened a platform, G, formed of a non-conducting material, preferably of vulcanite, to the upper surface of which is fastened an electro-magnet, M, having an armature, $k$, which plays upon two guide-pins, $n\,n$, which are fixed in the polar extremities of the said magnet, the armature $k$ being provided with the usual retractile spring, $m^2$.

Fixed to the back of the armature $k$ is a metal rod, $k'$, which projects rearwardly through a suitable aperture in the yoke of the electro-magnet, and is provided with a collar, $k^2$, to limit the forward movement of the armature.

To the edge of platform G, and on a line with the free end of rod $k'$, is fixed a curved projecting metal contact-piece, $n'$, having its free extremity rounded, one terminal of the electro-magnet M being connected thereto by wire 1, the other terminal of said electro-magnet being connected to the metal head $j'$ of shaft C by wire 2.

The platform G and the electro-magnet M, attached thereto, rotate within a concentric frame, H H H, which may be of any suitable non-conductor of electricity, said frame being supported by the standards I I I.

Fixed to the frame H H H is a series of drops, 3 4 5 6, Fig. 2, which are similar to those commonly known as "electrical annunciator drops or shutters." Each drop, when set, forms a part of the circuit which leads to an independent section of gas-burners. The flat metal plate $o$, which constitutes the drop, is hinged at $p$ to a suitable bearing, which is fixed to the outer vertical side of the frame H. The upper edge of plate $o$ is provided with a narrow arm, $p'$, which projects at right angles from said plate, one end of which is formed into a hook, $p^2$, which engages with a metal standard, $q$, which is fastened to the upper surface of the frame H. One end of a curved spring, $q'$, rests against the inner face of the drop-plate $o$, the other extremity of said spring being in metallic connection with the standard $q$ and a flat spring, $r$, the latter projecting rearwardly and making metallic contact with metal bracket $r'$, which is fixed to the inner face of the frame H, the said spring $r$ being of such length as to be in the path of the movable contact-piece $n'$, attached to platform G, which will force it upward and away from the bracket $r'$, as shown in Fig. 1.

Each instrument is provided with a suitable battery or other source of electricity, K. One pole of this battery is connected to one terminal of a spark-coil, J, (which is usually a large electro-magnet,) the other extremity of said spark-coil being connected to one terminal of the electro-magnet B by a wire, 10. The other pole of the battery K is connected by a wire, 13, to a gas-pipe, L, which acts as a return-wire. The gas-pipe is provided with four burners arranged in two circuits, 4' and 6'. Each burner has a fixed electrode, $w$, which is insulated from the burner, and a movable one, $t$, which is operated by the plug of the burner. As before stated, each drop or shutter, when set, forms a part of the circuit to an independent section of burners, and, as before explained, one terminal of the electro-magnet B is connected to the spark-coil and battery by wire 10. The other terminal of said magnet is connected to a wire, 7, which is connected to the bracket $r'$ of drop 6, and branch wires 8 and 9 of wire 7 are respectively connected to the bracket $r'$ of drop 4 and a binding-post, $s$, which is in metallic connection with the frame of clock-work A'. We will suppose that the current from the battery flows in the direction indicated by the arrows, Fig. 1. After passing through the magnet B, it passes by wires 7 and 8, through bracket $r'$, spring $r$, standard $q$, spring $q'$, to the drop-plate $o$, and from thence it passes to each of the fixed electrodes of the burners in each circuit.

In order to light the gas it is only necessary to turn the gas-cock in the ordinary manner, when the movable electrode is brought into contact with the fixed one, and is then carried beyond it. At the time contact is broken an electric spark is produced which will ignite the gas which flows from the orifice in the tip. During the time the electrodes were momentarily in contact the current flowing through the circuit energized the magnet B, which attracted the armature C', and with it the lever C². The rods $c'$ and $d$ were thus withdrawn, respectively, from contact with the lever E and escapement-rod $d'$, whereupon the edge $c$ of lever E dropped into the worm D, and the release of the escapement caused the clock-work or time mechanism A to operate. The clock-work continues to run while the electrodes are in contact; but when they are no longer together the circuit is opened, and the lever C² and its armature C' and attached rods $d$ and $c'$ are drawn upward by the retractile spring $e'$ to their normal position, and the further movement of the clock-work is stopped. This operation occurs whenever a lamp is lighted or extinguished. But suppose that the electrodes of one of the burners in No. 4 circuit remained in contact after the gas was lighted, or that the circuit-wire 11 in its course to the burners of No. 4 circuit came in contact with the return-wire, thus closing the circuit. The magnet B will now continue to attract the armature C' and its lever C², the clock-work mechanism will be released, the edge $c$ of lever E will drop into the thread of the worm, which carries it rearwardly, thus imparting a motion to the prolongation E² of lever E, which is communicated to the levers $l$ $l'$ and to the shaft $l^2$, the arm $m$, which is attached to said shaft, is moved rearwardly, as indicated by dotted lines, Fig. 3, which causes said arm to press against the extremity $m'$ of lever F until the escapement $i'$ is relieved of the pressure of pin $i$, and the pin $g^2$ is withdrawn from the slot $g'$ of wheel E', and the automatic spring-motor A' is rendered active. The platform G, attached to the revolving shaft C, is rotated within the frame H, and at each circuit drop the projection $n'$ comes in contact with and raises the spring $r$ and breaks contact between said spring and the bracket $r'$. If the circuit in connection with the drops is open, the magnet M remains inert; but upon reaching the spring $r$ of drop 4 (the circuit through which we will suppose to be closed) the current takes a new route, by wire 9, binding-post $s$, clock-work frame, to shaft C, metal head $j'$, terminal 2 of electro-magnet M, through said electro-magnet, thence by terminal 1 to curved projection $n'$, spring $r$, standard $q$, and spring $q'$ to the drop $o$ of circuit No. 4, thence by wire 11 to the burner, and the return-wires L and 13 to the battery. At the instant the current flows through the electro-magnet M the armature $k$ is attracted, and the rod $k'$, attached thereto, is thrown against the hook $p^2$ of arm $p'$ of the drop with such force that the hook is disengaged from the standard $q$ and the drop $o$ is tilted over, as shown by the arrow and dotted lines, Fig. 1. This operation opens the circuit to this section of burners. Simultaneous with the opening of the circuit the magnet B of clock-work A loses its attractive force, the lever C² is drawn upward, whereupon the detent $d^2$ is brought in contact with the escapement-rod $d'$, which arrests the clock-work. At the same time the rod $c'$, striking against the lever E, raises it and disengages the edge $c$ of said lever from the worm D, the said lever being drawn into its normal position by means of the retractile spring $g^3$. This movement of the lever causes the arm $m$, which is attached to shaft $l^2$, to release the extremity $m'$ of the lever F. The retractile spring $h'$, attached to said lever, now operates to press the pin $g^2$ against the periphery of wheel E'. After the drop $o$ has been tilted and the circuit broken the spring-motor A continues to run until the pin $g^2$ drops into the slot $g'$ of the wheel E', when the movement ceases. The electrical circuit to this section of burners having been broken, none of the burners can therefore be lighted with the spark until the defect in the circuit has been removed, after which the drop can be reset and the electric lighting in this section can be resumed. Thus it will be seen that where a series of independent circuits are operated from one source of electricity, if one or more of them by any means become closed longer than a fixed time, I am enabled to automatically throw these defective circuits out of the system, and thereby allow the perfect circuits to be operated as usual.

Figures 6, 7:
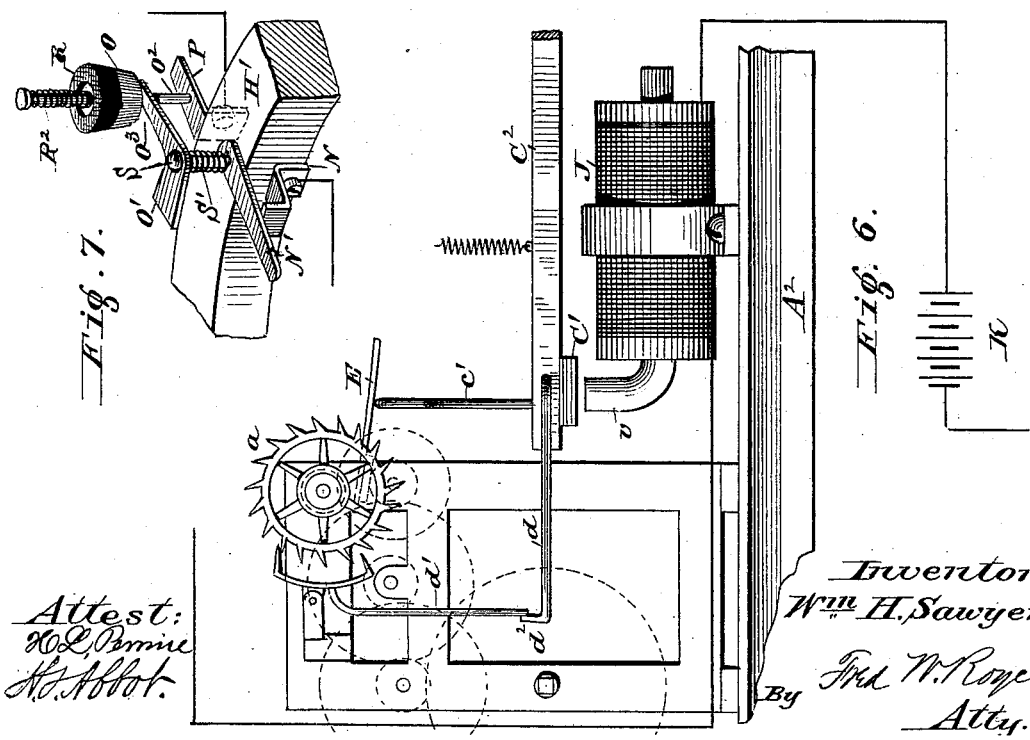

It is highly essential in the systems of electric gas-lighting to which my invention relates to reduce the resistance of the circuits to the minimum. In Fig. 6 is illustrated one method of accomplishing this. By dispensing with the electro-magnet B of Fig. 1 and substituting therefor the spark-coil J, which is provided with an elongated polar extremity, $v$, I am enabled to provide a very effective apparatus.

It will be readily seen that when the circuit is closed through battery K and coil J the pole $v$ will attract the armature $C'$, attached to lever $C^2$, and that the downward movement of the latter will withdraw the detent $d^2$ from contact with the escapement-rod $d'$, which will release the time mechanism.

The apparatus hereinbefore described is more directly adapted for use where a number of circuits are operated by one battery; but where but one circuit is necessary, I use the apparatus illustrated in Fig. 4, wherein the shutter $o'$ is pivoted to a metal standard, $G^2$, the said shutter being provided with two projecting arms, $x^2$ and $p^2$, the latter being curved and adapted to rest within a cup, $u$, which contains a suitable quantity of mercury, $u'$. Fixed to the standard $G^2$, but insulated therefrom by an insulating-block, $x$, is a spring, $x'$, having at its upper extremity an angular projection, $z$, upon which the projection $x^2$ rests. The circuit from the battery $K'$ passes by wire $10^c$ to and via the spark-coil $J'$, thence by wire $10^a$ to metal standard $w^2$, thence to spring $w'$ through electro-magnet $B'$, thence by wire $7^a$ to mercury in cup $u$, a branch line, 14, leading to spring $x'$. From the mercury the circuit passes to the arm $p^2$, shutter $o'$ to standard $G^2$, and by wire $7^b$ to the insulated fixed electrodes of each of the burners $y\ y\ y$. The return-wire $13^a$ is in metallic connection with the system of gas-pipe $L'$. The armature-lever $C^3$ is pivoted to a standard, $f^2$, and to one extremity is attached a detent, $d^3$, and a rod, $c^3$, similar in appearance and operation to $d$ and $c'$ of Fig. 1. The lever $E^3$ has a prolongation, $E^4$. One extremity of said lever has its edge turned down and adapted to fit into a worm, (not shown,) but which is fixed to the shaft of escapement-wheel $a'$, the said worm being similar in appearance to that shown in Fig. 5, with this difference, however, that it is reversed from the one shown in Fig. 5, the extremity of lever $E^3$, which carries the turned-down edge $e^2$, normally resting over the rear of said worm. When from any cause the circuit remains closed longer than is sufficient to light a lamp, the electro-magnet $B'$ attracts its armature, and with it the lever $C^3$, whereupon the detent $d^3$ releases the escapement and the mechanism is started. Coincident with the starting of the mechanism the edge $e^2$ of the lever $E^3$ falls into the worm, which carries the lever to the front against the stress of the spiral spring $e^3$, and the prolongation $E^4$ is brought in contact with the shutter or drop $o'$. The continued forward movement of the levers $E^3$ and $E^4$ will gradually force the drop back until the center of gravity is passed, when the said drop will fall in the direction of the arrow, and will assume a position as shown by dotted lines. The fall of the drop opens the circuit, whereupon the levers $C^3$ and $E^3$ return to their normal positions and the movement of the clockwork will cease. None of the burners in this circuit can now be lighted until the defect in the circuit has been removed, after which the drop can be set and the gas lighted by the spark as before. The object of providing the double contacts between the shutter and the wire $7^a$—namely, between spring $x'$ and arm $x^2$, and between arm $p^2$ and the mercury in cup $u$—is to insure a good contact and prevent any vibration. Although the contact between $x'$ and $x^2$ might be broken, yet the arm $p^2$ will remain in contact with the mercury until the drop begins to fall. The springs $w'$ and $w^2$, Fig. 4, are fastened to the base $A^3$ and form part of the circuit to the lamps. The spring $w^2$, at its free end, is bent back in such manner that when the driving-spring $v'$ expands to the position shown by dotted lines it will rest against the end $w^3$ and force the spring from contact with $w^2$, thereby opening the circuit and preventing the lighting of the gas. The object of this arrangement is to call attention to the apparatus and cause the rewinding of the spring.

It is obvious that the mechanism of clockwork A, Fig. 1, can be started by means of a local battery in connection with an electro-magnet operating to withdraw the pin $g^2$ from slot $g'$ of wheel $E'$. In Fig. 8 I have illustrated such an arrangement.

The lever F is pivoted to a standard, Q, and is provided with a suitable armature, an electro-magnet, $B^3$, being arranged to attract it. A local battery, $K^2$, has one of its poles connected to one terminal of electro-magnet $B^3$ by wire 16, the other pole of said battery being connected to a standard, $M^3$, by wire $16^a$. The standard $M^3$ has a right-angled extension, R. The magnet $B^3$ is connected by wire 15 to a standard, $M'$, to which is pivoted the bell-crank lever E, having the extension $E^2$. The lever E is similar in construction to that hereinbefore described, the free extremity $R'$ of which is arranged to drop into the worm D. When the worm D has been rotated long enough to carry the free extremity $R'$ to such a distance that the extension $E^2$ is brought into metallic contact with the extremity R of standard $M^3$, the local circuit before described is closed and the electro-magnet $B^3$ is rendered active and the armature end of lever F is drawn down, whereupon the pin $g^2$ is withdrawn from the slot $g'$ of wheel $E'$ and the mechanism is set in motion, which motion will continue until the local circuit is opened and the pin $g^2$ again enters the slot $g'$.

Fig. 7 illustrates a modification of the drop or shutter which forms a part of the circuit to a section of burners. The letter $H'$ designates a frame similar to H, Fig. 1. Two metallic standards, N and P, are fixed, respectively, to the inner and outer vertical sides of said frame.

The standard P carries a vertical metal pin, O², the said pin passing through a knob, the lower half of which, O, is of metal, and the upper half, R, being of vulcanite. This constitutes the drop. A flat spring, N', normally rests against the free end of standard N. A bell-crank lever having extremities O' and O³ is pivoted at S, a spiral spring, S', fixed to said pivot, serving to keep the end O³ of the lever against the pin O². To set the drop the knob is drawn upward against the stress of the spiral spring R². The metal half O will now rest upon the end O³ of the lever. The electric circuit enters at N, passes to spring N', thence to spiral S', bell-crank lever, lower half, O, of the drop, pin O², standard P, thence to a suitable wire. The operation of this device is similar to that described in connection with the drops illustrated in Fig. 1. The projection $n'$, Fig. 1, strikes the flat spring N' and disconnects it from N, and if a current exists in the circuit attached to this particular drop the rod $k'$ of magnet M will strike against O' and force O³ from under the drop, which will fall. The end O³ will now rest against the upper half of the knob, which being composed of insulating material, the circuit will be broken.

Having described my invention, I claim—

1. An electric circuit for lighting gas-burners or similar devices, equipped with a magnet normally out of action, and acting, when energized, as a contact-breaker to permanently break the operative circuit, and with a device arranged in the general circuit and acting by a too long continued closing thereof to throw the aforesaid magnet into circuit, and thereby permanently break the operative circuit, substantially as described.

2. The combination, in an electric circuit for gas-lighters or similar devices, of a magnet normally out of action, and acting, when energized, to permanently break the operative circuit, of a clock-work motor arranged, when released, to work a contact-breaker to throw said magnet into action, with an additional magnet in the general circuit having its armature or movable part arranged to release said clockwork to operate the contact-breaker when the general circuit remains closed longer than a normal period, substantially as described.

3. The combination, with two or more electric circuits and means for closing the same, and circuit-breaking devices arranged therein, of an electro-magnet arranged to act upon said circuit-breaking devices successively, automatic mechanism which connects said electro-magnet with said circuits, and a time mechanism controlled by an electro-magnet for starting said connecting mechanism at the expiration of a predetermined time after the closing of any of said circuits, substantially as described.

In testimony whereof I affix my signature in presence of two witnesses.

WILLIAM H. SAWYER.

Witnesses:
GILMAN E. JOPP,
SANFORD C. HOVEY.